UNITED STATES PATENT OFFICE.

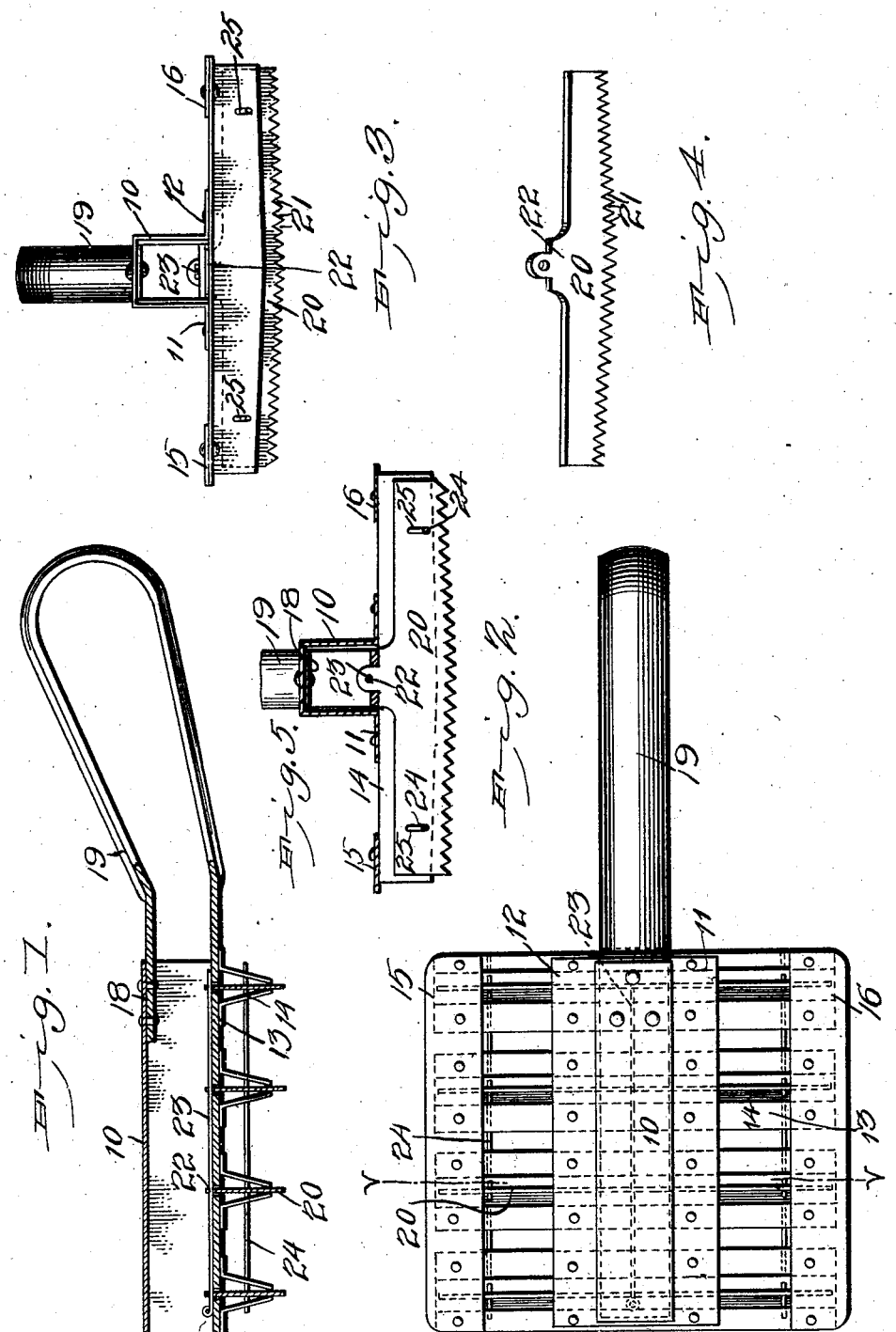

CHARLEY LIND, OF ISANTI, MINNESOTA.

CURRYCOMB.

SPECIFICATION forming part of Letters Patent No. 720,448, dated February 10, 1903.

Application filed August 11, 1902. Serial No. 119,320. (No model.)

*To all whom it may concern:*

Be it known that I, CHARLEY LIND, a citizen of the United States, residing at Isanti, in the county of Isanti and State of Minnesota, have invented a new and useful Currycomb, of which the following is a specification.

This invention relates to currycombs, and has for its object the production of a light, strong, and durable device which is capable of being cleaned while in use by the mere pressure of the hand of the operator, whereby the accumulations of dust, hair, and other matter are easily removed without interference with the operation of the device or causing delay.

The invention consists in certain novel features of construction, as hereinafter shown and described, and specified in the claims.

In the drawings illustrative of the invention, Figure 1 is a sectional side elevation. Fig. 2 is a plan view. Fig. 3 is a front elevation. Fig. 4 is a perspective view of one of the comb members detached. Fig. 5 is a transverse section on the line V V of Fig. 1.

The invention comprises a skeleton frame supporting a series of longitudinally-spaced bars closely embracing a corresponding series of spaced comb members, the latter yieldably supported in the frame between the longitudinally-spaced members and connected to a spring-handle, so that when an abnormal pressure is exerted upon the handle to compress it the movable comb members will be withdrawn into the frame and the accumulations thereon scraped off by the longitudinal members. Thus while in use the tension of the handle will be sufficient to maintain the comb members in operative position, but will yield to an abnormal pressure exerted by the hand of the operator to cause the comb members to be relieved of the accumulations of hair and other matter.

The supporting-frame consists of a central transverse frame or housing 10, having its lower edges bent outward at right angles, as shown at 11 12.

Attached to the under sides of the portions 11 12 are a plurality of bars arranged in pairs and spaced apart, as shown. Each of the bars is formed with a horizontal portion 13 and an angular portion 14 and each pair arranged in reverse order, so that the adjacent portions 14 are inclined toward each other with their lower edges close together, as shown in Fig. 1.

As many of the pairs of bars 13 14 may be employed as required; but for an ordinary currycomb four will be sufficient, as shown.

The bars 13 14 will be extended longitudinally and connected across their ends by stay-bars 15 16. The bars 15 16 and the portions 11 12 of the housing 10 will be secured to the portions 13 of the bars, as by rivets or other suitable fastenings, the whole thus forming a light, compact, and strong supporting-frame.

Attached by one end at 18 to one end of the housing 10 is a handle 19 in the form of a double-curved spring composed of a strip of metal extending outwardly from the housing and thence bent backwardly and passing through the housing and across the upper surfaces of the spaced bars 13 14 and in yieldable engagement therewith, so that in its normal position the lower portion of the handle member will rest in contact with the bars.

Disposed between each of the pairs of the portions 14 of the bars will be a comb-plate 20, the lower surface of the comb member being preferably curved and formed with the usual comb serrations 21.

The lower edges of the portions 14 of the bars will preferably be curved correspondingly to the curves of the comb members, as indicated in Fig. 3.

At their centers the comb members are extended upward, as indicated at 22, into the housing 10 through apertures in the free end of the handle member 19. The projections or ears 22 are formed with transverse perforations in alinement longitudinally of the housing to provide for the insertion of a tie-rod 23, by which means the comb members are detachably coupled to the handle member and to each other. The comb members are thus free to be moved upward between the portions 14 of the bars by the compression of the handle member, as will be obvious.

The tension of the handle member 19 will be sufficient to maintain the comb members normally in their extended position, as shown in Figs. 1 and 3, and to resist the pressure to which they will be subjected while in use;

but when the comb members require to have the accumulations of hair and other matter removed therefrom it is only necessary for the operator to compress the handle member by the simple pressure of the hand, which action causes the comb members to be withdrawn inward between the closely-engaging lower ends of the portions 14, and thereby scrape off all the accumulated matter. When the pressure has been removed, the reaction of the spring-handle will restore the comb members to their normal position again ready for action.

The operation of the handle member may be accomplished very quickly and without interfering with the work or causing delay, as the action may take place in moving the device from one part of the animal to the other, and the action is so quickly performed that there is practically no time lost in cleaning the comb, as it is only necessary for the operator to compress the fingers of the hand holding the comb and then release them, when the spring will automatically restore the comb members to their normal position, and this action can take place so quickly as to be almost an involuntary movement, and will consequently require no stoppage of the motion of the operator.

The comb members 20 may be further supported near their ends by transverse rods 24 passing through the comb members and also through vertical slots 25 in the portions 14 of the bars, the rods thus holding and supporting the comb members, and the slots providing for the necessary vertical movement when the handle member is compressed.

In constructing the comb as above described one frame only is necessary, the comb-blades being coupled together and to the handle by tie-rods, which produces a comb very light to handle and cheap to manufacture and one in which the comb-blades may be removed and new ones inserted when necessary.

The whole device will be formed of sheet metal, preferably of steel, but may be of other suitable metal or partially of steel and partially of other metal.

The device may be of any size and employed to curry any species of animal requiring such treatment.

The device may be modified in minor particulars without departing from the principle of the invention or sacrificing any of its advantages.

Having thus described my invention, what I claim is—

1. A currycomb comprising a frame having spaced scrapers, a collapsible looped handle attached at one end to said frame, and movable comb-blades disposed between said scrapers and detachably connected with the free end of said handle.

2. A currycomb comprising a frame having spaced scrapers, a yieldable looped handle attached at one end to said frame, movable comb-blades disposed between said scrapers and detachably connected with the free end of said handle, and means for limiting the outward movement of said free end.

3. A currycomb comprising a frame having a longitudinally-disposed guide-housing provided with flanges extending laterally therefrom, a plurality of spaced guard-plates extending transversely in relation to said housing and secured to the flanges thereof and adapted to form scrapers, comb members movably supported between said guard-plates, and a yieldable handle connected at one end to said guide-housing and having its free end extended into said guide-housing and detachably connected with the movable comb members.

4. A currycomb comprising a frame having spaced scrapers, a guide mounted on said frame and spaced therefrom, a looped spring-handle attached at one end to said guide and extending laterally therefrom and having its free end disposed within said guide, and movable comb-blades disposed between said scrapers and detachably connected with the free end of said handle within said guide.

5. A currycomb comprising a frame having spaced scrapers, a guide-housing mounted on said frame, a looped spring-handle attached at one end to said guide-housing and having its looped portion extending laterally therefrom, and its free end disposed within said housing, movable comb-blades disposed between said scrapers and having projections extending through slots in the free end of said handle, and a tie-rod engaging said projections for detachably connecting said blades to said handle.

In testimony that I claim the foregoing as my own I have hereto affixed my signature in the presence of two witnesses.

CHARLEY LIND.

Witnesses:
EDWIN DANIELSON,
W. W. SHULEAN.